United States Patent Office 3,275,669
Patented Sept. 27, 1966

3,275,669
PREPARATION OF ORGANIC ISOCYANATES FROM N,N'-DISUBSTITUTED ALLOPHANYL CHLORIDES
Henri Ulrich, Northford, James N. Tilley, Hamden, and Adnan A. Sayigh, North Haven, Conn., assignors, by mesne assignments, to The Upjohn Company, Kalamazoo, Mich., a corporation of Delaware
No Drawing. Filed Sept. 10, 1962, Ser. No. 222,647
10 Claims. (Cl. 260—453)

The present invention relates generally to new and improved processes for making useful organic compounds. In addition, it relates generally to new organic compounds from which the useful organic compounds can be produced and to processes for making our new organic compounds.

More specifically, it is concerned with new and improved processes for making organic isocyanates from our new N,N'-disubstituted allophanyl chlorides and with processes for making our new N,N'-disubstituted allophanyl chlorides.

It is known to make isocyanates both aromatic and aliphatic by phosgenation in the liquid reaction systems of the corresponding primary amine, or the amine hydrochloride; i.e., in the presence of an inert solvent for the amine or an inert suspending medium or diluent for the amine hydrochloride. For this purpose a variety of solvents or suspending liquids have been proposed, mostly hydrocarbons or chlorinated hydrocarbons, including aromatics and some aliphatics. In these liquid phase operations using as starting materials for the phosgenation, either the amine or the amine hyrochloride, as the case may be, an initial or intermediate reaction product is the corresponding carbamyl chloride which decomposes or is decomposed to the desired isocyanate.

Starting with the amine, as well as with the insoluble amine hydrochloride, a heterogeneous system, with all its problems and difficulties, is inevitably encountered in the reaction zone. Simultaneously and instantaneously upon reaction of phosgene with the amine, the solid amine hydrochloride is formed by action of the released hydrogen chloride upon as yet unconverted amine.

$$RNH_2 + COCl_2 \rightarrow RNHCOCl + HCl$$
$$RNHCOCl \rightarrow RNCO + HCl$$
$$2HCl + 2RNH_2 \rightarrow 2RNH_3Cl$$

For accomplishing the mixing and reacting of the amine or its hydrochloride with the phosgene, a large variety of procedures and expedients have been suggested in most all of which at least some attention has been paid either directly or indirectly to such problems as handling of the resulting slurry and completion of the phosgenation of the slower reacting amine hydrochloride in the presence of already formed carbamyl chloride or the isocyanate itself. For instance, it has been proposed to carry out the process in two stages with the reaction mixture being heated in a second stage to decompose the carbamyl chloride after the reaction mixture has been formed in a first stage at a lower temperature. Another suggestion involved separation of the amine hydrochloride slurry from the other reaction products followed by separate treatment. Still another expedient was the proposal to carry out the reaction under superatmospheric pressure with venting of the hydrogen chloride as fast as it is formed. In all of the foregoing the difficulties are still further complicated by the practical necessity of using the phosgene in substantial excess over the amine or its hydrochloride with attendant problems of recovery or recycling of the excess phosgene.

The present invention in one embodiment thereof is based on our discovery that organic isocyanates, which heretofore were not readily attainable except with considerable difficulty, can now be conveniently produced in good yield and at reasonable cost by decomposition of our new N,N'-disubstituted allophanyl chlorides with release of hydrogen chloride therefrom.

Referring to the production of butyl isocyanate from N,N'-dibutyl allophanyl chloride as a matter of convenience in describing the invention, the reaction that takes place can be represented by the following equation:

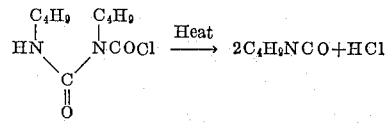

The reaction as illustrated with reference to the decomposition of N,N'-dibutyl allophanyl chloride is not limited thereto but is applicable generally to N,N'-disubstituted allophanyl chlorides having a hydrogen atom attached to a nitrogen atom of the characteristic group thereof

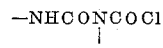

and organic substituents, preferably aliphatic substituents, having 1 to 18 carbon atoms to the substituent. The term "aliphatic," as used herein, is meant to include cyclic aliphatic as well as acyclic aliphatic substituents. It is also an essential feature of our compounds that the substituents on nitrogen are free of groups reactive with phosgene (carbonyl chloride), as for instance, free of alcoholic hydroxyl, amino, mercapto (sulfhydryl), carboxyl and the like. A chlorine atom attached directly to a carbon atom of the substituents is not reactive with phosgene, and the presence of chlorine in the molecule attached to carbon atoms other than those directly attached to the nitrogen atoms is not excluded. Conformably with the foregoing, the substituents per se can each be cycloaliphatic, as well as acyclic or aralkylene provided the carbon atoms attached to the nitrogen atoms are aliphatic.

Representative of our new allophanyl chlorides and the isocyanates which can be made therefrom by our process are the following:

| Allophanyl chloride: | Isocyanate |
|---|---|
| N,N'-dimethyl | Methyl. |
| N,N'-diethyl | Ethyl. |
| N,N'-dipropyl | Propyl. |
| N,N'-dibutyl | Butyl. |
| N,N'-diisopropyl | Isopropyl. |
| N,N'-di(t-butyl) | t-Butyl. |
| N,N'-di(t-octyl) | t-Octyl. |
| N,N'-di(octadecyl) | Octadecyl. |
| N,N'-dinonyl | Nonyl. |
| N,N'-dihexyl | Hexyl. |
| N,N'-dipentyl | Pentyl. |
| N,N'-didecyl | Decyl. |
| N,N'-didodecyl | Dodecyl. |
| N,N'-diundecyl | Undecyl. |
| N,N'-di(2,7-dimethyloctyl) | 2,7-dimethyloctyl. |
| N,N'-diisoamyl | Isoamyl. |
| N,N'-di(3-ethylhexyl) | 3-ethylhexyl. |
| N,N'-di(2,5-dimethylhexyl) | 2,5-dimethylhexyl. |

| Allophanyl chloride: | Isocyanate |
|---|---|
| N,N'-di(sec-butyl) | Sec-butyl. |
| N,N'-di(t-butyl) | t-Butyl. |
| N,N'-di(2,2,3-trimethylbutyl) | 2,2,3-trimethylbutyl. |
| N,N'-di(1,3,5-trimethylcyclohexyl) | 1,3,5-trimethylcyclohexyl. |
| N,N'-di(p-menthyl) | p-Menthyl. |
| N,N'-di(1-phenylbutyl) | 1-phenylbutyl. |
| N,N'-dicyclohexyl | Cyclohexyl. |
| N,N'-dicyclopentyl | Cyclopentyl. |
| N,N'-di(phenylethyl) | Phenylethyl. |

According to our experience the converson of the allophanyl chloride to the isocyanate is best carried out in the presence of an inert solvent. In order to minimize undesired reactions of the isocyanate product during the reaction period, it will be found advantageous not to use a too highly concentrated solution or reaction mixture especially when high temperature is employed. Good results have been obtained with a concentration based upon a proportion of from about 1 to 25 percent of the allophanyl chloride in the solution by weight; that is, an amount of solvent which is from about 3 to 99 times the weight of the allophanyl chloride. A proportion of solvent which is about 5 to 7.5 times the weight of the allophanyl chloride is preferred.

Representative of the inert solvents that can be used are the following:

Non-polar:
    Benzene
    Toluene
    Biphenyl
    Naphthalene
    Alpha-methylnaphthalene
    Beta-methylnaphthalene
    High boiling petroleum fractions Polar:
    Chloroform (most polar)
    Methylene chloride
    Ethylene dichloride
    Trichloroethane
    Tetrachloroethane
    Monochlorobenzene
    Orthodichlorobenzene
    Trichlorobenzenes
    Chlorotoluenes
    Chlorobiphenyls
    Dichlorobiphenyls
    Chloronaphthalenes
    Dialkylethers
    Tetrahydrofuran Of these the polar solvents are preferred over the non-polar solvents and of both the polar and non-polar solvents those having a normal boiling point in and about the range of from 130° to 250° C. are preferred over those normally boiling at lower temperatures. However, where it is desired to use a particular solvent at a reaction temperature above its normal boiling point, as for instance in the case of the lower boiling solvents, the process can be carried out under superatmospheric pressure.

The use in the reaction mixture of a catalyst-scavenger for the hydrogen chloride by-product has been found by us to give good results, where it is desired to speed up the reaction rate at a particular reaction temperature over that normally obtaining. The advantage of using a catalyst-scavenger will be the more noticeable, however, in carrying out the reaction at temperatures in the lower ranges as for instance below 130° to 150° C. where its use is recommended. By the term catalyst-scavenger for the hydrogen chloride, as used herein, is meant an acceptor for the hydrogen chloride by-product, as for instance, the tertiary amines, of which the following are representative:

Trimethylamine
Triethylamine
Methyl, ethyl tertiary amines
Tripropyl amines
Tributyl amines
Methyl, ethyl, propyltertiary amines
Methyl, butyl tertiary amines
Collidine
Dimethyl aniline
Diethyl aniline
Methyl, ethyl pyridine Of these the more weakly basic tertiary amines of which collidine is exemplary can be used without necessarily resorting for best results to stoichiometric amounts; that is the amount theoretically required to react with all the hydrogen chloride by-product. The more strongly basic the teritary amine, as for instance, the lower tertiary alkyl amines, the less its tendency to yield up or release continuously the hydrogen chloride with which it has combined. The weaker amines of which collidine is representative are preferred.

In carrying out our process we have used temperatures from as low as 0° C. to as high as 250° C. with good results. Temperatures above 250° C. can be also employed but the temperature in any case should not be so high in an endeavor to speed up the reaction as to favor decomposition of the isocyanate product. Usually it will be unnecessary to resort to temperatures above 250° to 300° C. in that no commensurate increase in reaction rate is thereby achieved. The reaction rate is to a degree temperature dependent in the sense that the lower the temperature employed, as for instance below about 150° C., the rate also tends to diminish to the extent that it is advantageous to employ in the reaction mixture a catalyst-scavenger for the hydrogen chloride. With weaker tertiary amines, as for instance collidine, a reaction temperature in the range of about 0° to 150° C. is preferred.

Our new N,N'-disubstituted, especially N,N'-dialkyl, allophanyl chlorides useful in making, by our new process, the heretofore difficultly attainable substituted isocyanates, can themselves be readily and conveniently produced in good yield by the reaction of the corresponding N,N'-disubstituted, or N,N'-dialkyl, ureas with phosgene. By the term, N,N'-disubstituted urea as used herein is meant a urea having the characteristic group, —NHCONH—, with each nitrogen atom thereof having attached thereto a hydrogen atom and an aliphatic carbon atom of a monovalent organic radical having 1 to 18 carbon atoms free of groups which are reactive with phosgene.

The reaction that takes place between such aliphatic disubstituted ureas and phosgene (carbonyl chloride) can be represented by the following equation, here again referring specifically to N,N'-dibutyl allophanyl chloride as a matter of convenient illustration in more fully describing the invention:

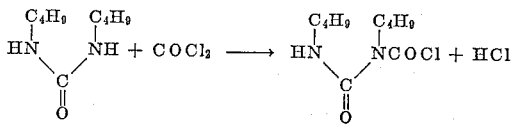

The reaction is not limited in its usefulness to the production of N,N'-dibutyl allophanyl chloride but is applicable generally to the preparation of N,N'-disubstituted allophanyl chlorides from the corresponding N,N'-disubstituted ureas having organic, preferably aliphatic substituents with from one to eighteen carbon atoms to the N-substituent, in addition to the carbonyl carbon atom of the characteristic group, —NHCONH—, and which except for such characteristic group is free of other groups reactive with phosgene, as for instance free of alcoholic hydroxyl, amino, mercapto, (sulfhydryl) carboxyl and the like. A chlorine atom attached directly to a carbon atom which is itself not attached directly to a nitrogen is not reactive under the conditions of the reaction, and the presence of such chlorine atoms is not excluded. Stated in other words the process is applicable generally to the production of N,N'-disubstituted allophanyl chlorides from the corresponding N,N'-disubstituted ureas in which the allophanyl chloride or the urea have two substituents each of which contains not more than eighteen carbon atoms, respectively, of which the carbon atom attached to nitrogen of the respective characteristic groups,

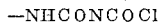

and —NHCONH—, is aliphatic. Subject to the foregoing the carbon atoms of the substituents on nitrogen of both the allophanyl chloride, and the urea from which it is made, can be aliphatic, including cycloaliphatic, aralkyl, and aryl, provided none but aliphatic, including cycloaliphatic, carbons are attached directly to the nitrogen atoms.

Representative of the aliphatic disubstituted allophanyl chlorides and the corresponding aliphatic disubstituted ureas from which they can be made by our process are the following, the naming of the N-substituents being the same for both.

*N,N'-dialkyl urea and allophanyl chloride*

N,N'-dimethyl
N,N'-diethyl
N,N'-dipropyl
N,N'-dibutyl
N,N'-diisopropyl
N,N'-di(t-butyl)
N,N'-di(t-octyl)
N,N'-di(octadecyl)
N,N'-dinonyl
N,N'-dihexyl
N,N'-dipentyl
N,N'-didecyl
N,N'-didodecyl
N,N'-diundecyl
N,N'-di(2,7-dimethyloctyl)
N,N'-diisoamyl
N,N'-di(3-ethylhexyl)
N,N'-di(2,5-dimethylhexyl)
N,N'-di(sec-butyl)
N,N'-di(bi-t-butyl)
N,N'-di(2,2,3-trimethylbutyl)
N,N'-di(1,3,5-trimethylcyclohexyl)
N,N'-di(p-menthyl)
N,N'-di(1-phenylbutyl)
N,N'-dicyclohexyl
N,N'-dicyclopentyl
N,N'-di(phenylethyl)

Using substantially equimolar amounts of the N,N'-disubstituted urea and of the phosgene, the reaction proceeds smoothly with almost quantitative yields of the corresponding N,N'-disubstituted allophanyl cholride. Hydrogen chloride is evolved, indicating that the reaction is taking place. An excess of phosgene can be used if desired, but not matter how much the excess employed, it does not react with the hydrogen atom of the characteristic allophanyl chloride group,

according to our studies and tests. Also according to our tests, the reaction is best carried out in the presence of an inert solvent for the N,N'disubstituted urea, of which the following solvents are representative:

Chloroform
Methylene chloride
Trichloroethane
Polychloro lower alkanes
Chlorobenzene
Dichlorobenzene
Trichlorobenzenes
Dioxane
Tetrahydrofurane
Benzene
Toluene
Xylenes
Ligroin
Lower dialkyl ethers having up to eight carbon atoms to the alkyl group thereof;
Dimethyl ether
Diethyl ether
Dipropyl ethers
Dibutyl ethers
Dioctyl ethers
Mixed lower dialkyl ethers The procedures that can be employed for bringing about the reaction of the urea and the phosgene are not narrowly critical, and involve primarily a mixing of the two reactants in accord with well-established principles and techniques for carrying out chemical reactions. By way of illustration, each dissolved in, or diluted with, a solvent can be introduced either continuously or stepwise into a reaction vessel or flask. This reaction vessel itself can, if desired, first be charged with an amount of inert solvent or diluent. Alternatively, the phosgene can be passed as a gas into a reaction flask already charged with solvent and into which the urea is being introduced at the same time.

When all of the reactants have been added the reaction mixture can be heated to facilitate completion of the reaction and to expel any remaining traces of hydrogen chloride by-product, together with any unreacted phosgene, especially if the latter were used in excess. A stream of inert gas, as for instance nitrogen, can also be used to aid in sweeping out the hydrogen chloride and phosgene.

The temperature at which the reaction can be carried out is not narrowly critical. We have used temperatures ranging from 0° to 80° C. with good results, which temperatures are generally preferred. Temperatures below 0° C. can also be used if desired without noticeably affecting the rate of reaction adversely. Temperatures above 80° C. and as high as 130° C. can also be used, particularly if it is desired to proceed directly from the N,N'-disubstituted urea to the isocyanate, after converting all of the urea to the allophanyl chloride, without first recovering the allophanyl chloride intermediate as such, following the procedure described above for making the isocyanate.

The examples that follow are illustrative:

*Example 1*

*N,N'-dibutyl allophanyl chloride*

Into a reaction vessel were charged 73.4 grams (0.74 mole) of phosgene dissolved in 300 milliliters (about 265 grams) of benzene. To this solution were added dropwise 51.6 grams (0.3 mole) of N,N'-dibutyl urea dissolved in 216 milliliters (about 225 grams) of benzene over a period of 90 minutes. Hydrogen chloride was evolved. During the addition the reaction mixture was vigorously stirred and the temperature kept at 8° to 10° C. approximately, while nitrogen was passed through the reaction vessel to sweep out the hydrogen chloride. After the addition was completed, the reaction mixture was heated to a temperature of about 80° to 85° C. (about the boiling temperature of the reaction mixture) under moderate reflux at atmospheric pressure while the nitrogen flow was continued to sweep out any unreacted phosgene. There was obtained, upon evaporation of the benzene, 70.3 grams of N,N'-dibutyl allophanyl chloride corresponding to a yield of 100 per cent, based on the dibutyl urea.

According to the infrared spectrum the product was pure N,N'-dibutyl allophanyl chloride as measured by the absorbence of the C=O absorption at 5.76μ. Analysis, total chloride: found: 15.61 percent. Calculated for $C_{10}H_{19}ClN_2O_2$: 15.3 percent. A two gram sample of the product yielded on vacuum distillation 1.8 grams of N,N'-dibutyl allophanyl chloride boiling at 98° C. at a reduced pressure of 0.5 millimeter of mercury absolute: $n_D^{23}$, 1.4662, analysis: Calculated for $C_{10}H_{19}ClN_2O_2$: C, 51.17; H, 8.15; N, 11.97. Found: C, 51.36; H, 8.32; N, 12.00.

EXAMPLE 2

N,N'-dibutyl allophanyl chloride

Following the procedure of Example 1, 51.6 grams (0.3 mole) of N,N'-dibutyl urea dissolved in 516 milliliters (almost 9 times its weight) of benzene were charged into a reactor and gaseous phosgene introduced until a total of about 49.5 grams (0.5 mole) had been added. Until the addition had been completed the temperature of the reaction mixture was kept at about 8° to 10° C. Thereafter it was heated to the boiling temperature of the reaction mixture, about 80° to 85° C., under moderate reflux at atmospheric pressure while passing nitrogen gas through the vessel to sweep out the last traces of hydrogen chloride as well as any unreacted phosgene.

Upon evaporation of the benzene, there was obtained as a residue 73.9 grams of crude N,N'-dibutyl allophanyl chloride as compared with 70.7 grams (0.3 mole) expected by theory, based on the N,N'-dibutyl urea.

According to the infrared spectrum, however, the yield was indicated to be 90.5 percent of theory as measured by the absorbence of the C=O absorption at 5.76μ.

EXAMPLE 3

N,N'-dibutyl allophanyl chloride

A solution of 51.6 grams (0.3 mole) of N,N'-dibutyl urea in 516 milliliters of benzene was prepared. To this solution, maintained at 8° to 10° C., about 49.5 grams (0.5 mole) of phosgene were added over a period of about 90 minutes. Hydrogen chloride was evolved. After the addition of phosgene was finished the reaction mixture was heated to a temperature of about 80° to 85° C. under moderate reflux at atmospheric pressure while nitrogen was passed through the solution to sweep out hydrogen chloride and any unreacted phosgene. There was obtained 73.9 grams of N,N'-dibutyl allophanyl chloride corresponding to a yield of 90.5 percent based on the dibutyl urea. The infra red spectrum confirmed the product as N,N'-dibutyl allophanyl chloride by the absorbence of the C=O absorption at 5.76μ.

EXAMPLE 4

N,N'-dimethyl allophanyl chloride

A solution of 97.2 grams (0.98 mole) of phosgene dissolved in 240 milliliters of chloroform (about 3.6 times the weight of phosgene) was charged into a reaction vessel and held at a temperature of about 5° C. To this charge was then added dropwise over a period of 90 minutes a solution of 44 grams (0.5 mole) of N,N'-dimethyl urea in 200 milliliters (about 300 grams) of chloroform also cooled to about 5° C. Hydrogen chloride was evolved, and during the addition gaseous nitrogen was passed through the reaction zone to sweep out the hydrogen chloride. Thereafter the reaction mixture was heated under reflux at atmospheric pressure for a period of about one hour at a temperature of about 60° to 65° C. while continuing to sweep out the hydrogen chloride with nitrogen.

Upon the evaporation of the chloroform and the addition of 30.0 milliliters of dry diethyl ether, a precipitate amounting to 27 grams was formed which was filtered off. Upon evaporation of the ether filtrate there was obtained 42.5 grams of N,N'-dimethyl allophanyl chloride having a melting point of 36° C. The yield based on the dimethyl urea was 56.5 percent. Analysis for nitrogen, found 18.40 percent. Calculated for $C_4H_7ClN_2O_2$, nitrogen, 18.61 percent.

EXAMPLE 5

N,N'-dimethyl allophanyl chloride

A solution of 18.5 grams (0.21 mole) of N,N'-dimethyl urea in 110 milliliters of benzene was prepared and maintained at a temperature of 5° to 7° C. To this solution 22 grams (0.22 mole) of phosgene dissolved in 76 milliliters of benzene were added over a period of 30 minutes. Hydrogen chloride was evolved and after the addition was completed the reaction mixture was stirred for 45 minutes at room temperature. The reaction mixture was then purged with nitrogen to remove hydrogen chloride and unreacted phosgene. The liquid phase was withdrawn and the benzene was evaporated to provide 18.3 grams of N,N'-dimethyl allophanyl chloride having a melting point of 36° C. and representing a 57.9 percent yield based on the dimethyl urea.

EXAMPLE 6

N,N'-dimethyl allophanyl chloride

A solution of 18.5 grams (0.21 mole) of N,N'-dimethyl urea in 110 milliliters of ethylene dichloride was prepared and held at 3° to 5° C. while 22.2 grams (0.22 mole) of phosgene dissolved in 75 milliliters of ethylene dichloride were slowly added over a period of 40 minutes. After stirring the reaction mixture for 90 minutes at about 3° to 5° C., the reaction mixture was purged with nitrogen to sweep out hydrogen chloride and unreacted phosgene. The ethylene dichloride was evaporated and the residue was treated twice with 200 milliliters of dry ether. The liquid phase ether was withdrawn and evaporated to provide 22.4 grams of N,N'-dimethyl allophanyl chloride representing a 70.9 percent yield based on dimethyl urea.

EXAMPLE 7

N,N'-di(t-octyl) allophanyl chloride

A mixture of 162 grams (1.25 moles) of t-octylamine was refluxed with 30 grams (0.5 mole) of urea for five hours at atmospheric pressure. The temperature rose from 140° to 168° C. during refluxing. On cooling, the N,N'-di(t-octyl) urea crystallized. It was washed with ligroin and recrystallized from iso-octane. Thus, 89 grams of N,N'-di(t-octyl) urea having a melting point of 153.5° to 155° C. were obtained, corresponding to a yield of 62.5 percent based on the urea.

To a solution of 39.7 grams (0.14 mole) of N,N'-di(t-octyl) urea in 297 milliliters of benzene, 15.1 grams (0.15 mole) of phosgene dissolved in 100 milliliters of benzene were added over a period of 56 minutes while maintaining the solution at a temperature of 8° C. The reaction mixture was purged with nitrogen at 52° C. to sweep out hydrogen chloride and unreacted phosgene. The resulting mixture was then evaporated to provide about 37.1 grams of crude N,N'-di(t-octyl) allophanyl chloride. The infrared spectrum confirmed the product as N,N'-di(t-octyl) allophanyl chloride by the absorbence of the C=O at 5.65μ.

EXAMPLE 8

N,N'-di(t-butyl) allophanyl chloride

To a solution of 34.4 grams (0.2 mole) of N,N'-di(t-butyl) urea in 244 milliliters of ethylene dichloride, 19.8 grams (0.2 mole) of phosgene dissolved in 100 milliliters of ethylene dichloride were added dropwise with stirring and cooling to maintain the solution at 4° to 6° C. The addition was conducted over a period of 20 minutes. The reaction mixture was then stirred for 30 minutes at 4° to 6° C. and purged with nitrogen at 50° C. for an additional 30 minutes. Evaporation of the solvent under reduced pressure gave 36.8 grams of a crude product from which 7.5 grams (corresponding to a yield of 16 percent based on the di(t-butyl) urea) of N,N'-di(t-butyl) allophanyl chloride was separated upon trituration with ether. The infra red spectrum of the product in chloroform confirmed it as N,N'-di(t-butyl) allophanyl chloride by the absorbence of the C=O absorption at 5.64μ and the NH absorbence at 3.15μ.

EXAMPLE 9

N,N'-di(octadecyl) allophanyl chloride

A solution of 32.7 grams (0.058 mole) of N,N'-di(octadecyl) urea in 227 milliliters of ethylene dichloride was prepared. To this solution were then added dropwise over a period of 80 minutes 5.8 grams (0.0587 mole) of phosgene in 100 milliliters of ethylene dichloride while stirring the mixture and maintaining it at 2° C. Hydrogen chloride was evolved and during the addition gaseous nitrogen was passed through the reaction zone to sweep out the hydrogen chloride and unreacted phosgene. Thereafter the reaction mixture was heated under reflux at atmospheric pressure for a period of about 40 minutes at a temperature of about 75° to 80° C., while purging with nitrogen. Then, the solvent was evaporated under reduced pressure.

The residue was refluxed at atmospheric pressure for 30 minutes at a temperature of 30° to 35° C. with 300 milliliters of dry ether and then filtered. The ether was evaporated from the filtrate to provide 25 grams (corresponding to a yield of 69 percent based on N,N'-di(octadecyl) urea) of N,N'-di(octadecyl) allophanyl chloride which after recrystallizing from acetone had a melting point of 68° to 69° C. The infrared spectrum in chloroform confirmed the product as N,N'-di(octadecyl) allophanyl chloride by the absorbences of NH absorption at 3.01μ and of the C=O absorption at 5.80μ.

EXAMPLE 10

Butyl isocyanate from N,N'-dibutyl allophanyl chloride

A sample of N,N'-dibutyl allophanyl chloride (10 grams: 0.424 mole) was dissolved in 100 milliliters (about 13 times its weight) of orthodichlorobenzene and the solution heated at a temperature of about 180° to 185° C. under moderate reflux for a period of one hour. Hydrogen chloride was evolved during the heating. At the end of that time the infrared spectrum in the orthodichlorobenzene indicated that the N,N'-dibutyl allophanyl chloride had been completely converted to n-butyl isocyanate. The n-butyl isocyanate was separated from the orthodichlorobenzene by distillation and was found to be indentical with n-butyl isocyanate available commercially and made by another process.

EXAMPLE 11

Octadecyl isocyanate from N,N'-di(octadecyl) allophanyl chloride

A solution of 6.26 grams (0.01 mole) of N,N'-di(octadecyl) allophanyl chloride in 62.6 milliliters of orthodichlorobenzene was prepared and refluxed for 3 hours at atmospheric pressure. The evolution of hydrogen chloride was vigorous in the first hour and gradually ceased during the final portions of the heating period. The infrared spectrum indicated complete conversion to octadecyl isocyanate by a strong absorption at 4.43μ and disappearance of the C=O absorption at 5.8μ. The product was separated from the solvent and had a boiling point of 151° to 160° C. at 0.3 millimeter mercury absolute, reduced pressure.

EXAMPLE 12 t-Butyl isocyanate from N,N'-di(t-butyl) allophanyl chloride

A solution of N,N'-di(t-butyl) allophanyl chloride in orthodichlorobenzene was refluxed for 30 minutes at atmospheric pressure. The infrared spectrum in orthodichlorobenzene indicated a complete disappearance of the C=O absorption at 5.64μ and the occurrence of the characteristic isocyanate absorption at 4.45μ. The t-butyl isocyanate, boiling point 85° C., was recovered from the orthiodichlorobenzene by distillation.

EXAMPLE 13

Methyl isocyanate from N,N'-dimethyl allophanyl chloride

A solution of 15.05 grams (0.1 mole) of N,N'-dimethyl allophanyl chloride in 150 milliliters of orthodichlorobenzene was heated for two hours at a temperature of 150° to 185° C. under reflux at atmospheric pressure. Hydrogen chloride was evolved vigorously beginning at a temperature of 150° C. The infrared spectrum of the reaction mixture indicated a complete conversion to methyl isocyanate. The methyl isocyanate was separated from the orthodichlorobenzene by distillation and was found to be identical with methyl isocyanate available commercially and made by another process.

EXAMPLE 14

N,N'-diisopropyl allophanyl chloride

An aqueous solution of 100 grams sodium hydroxide in 600 milliliters of water was prepared and 104.5 grams (1.77 moles) of isopropyl amine was added thereto at 20° C. Then, 1.1 moles of phosgene were added while stirring and maintaining the mixture below 30° C. A precipitate formed and was filtered, washed with water and dried. The precipitate was recrystallized from ethanol to provide 67.6 grams of N,N'-diisopropyl urea having a melting point of 192° C.

A solution containing 28.8 grams (0.2 mole) of N,N'-diisopropyl urea in 150 milliliters of ethylene dichloride was prepared. To this solution which was maintained at 2° to 5° C., 21.5 grams (0.21 mole) of phosgene dissolved in 140 milliliters of ethylene dichloride were added over period of 42 minutes. After stirring the reaction mixture for one hour at room temperature, it was purged with nitrogen and the solvent was evaporated. The residue was treated with ether and the ether was evaporated. The residue was recrystallized from ligroin to provide 2.8 grams (corresponding to a yield of 6.7 percent based on the starting urea) of susbtantially pure N,N'-diisopropyl allophanyl chloride having a melting point of 63° C. Elemental analysis provided the following data:

Calculated for $C_8H_{15}ClN_2O_2$: C, 46.49; H, 7.31; N, 13.55. Found: C, 46.42; H, 7.50; N, 13.41.

EXAMPLE 15

N,N'-dicyclohexyl allophanyl chloride

To 60.4 grams (0.27 mole) of N,N'-dicyclohexyl urea in 400 milliliters of ethylene dichloride 27.4 grams (0.28 mole) of phosgene in 200 milliliters of ethylene dichloride were added at 1° to 2° C. over a period of 50 minutes. After stirring for one hour at room temperature, purging and evaporation of the solvent, the resulting residue was refluxed at atmospheric pressure for 30 minutes with 400 milliliters of dry ether. Evaporation of the ether afforded 9.7 grams (12.5 percent yield based on the starting urea) of N,N'-dicyclohexyl allophanyl chloride having a melting point of 127° to 128° C. Elemental analysis provided the following—

Calculated for $C_{14}H_{13}ClN_2O_2$: N, 9.77. Found: N, 9.25.

The organic isocyanates prepared according to this invention can be employed as reactants with active hydrogen compounds, such as for instance alcohols, phenols, amines, sulfonamides and the like to prepare carbamates and sulfo-ureas. Carbamates and sulfo-ureas in turn are useful as insecticides, pharmaceuticals, including oral diabetic treatment. The organic isocyanates can also be homopolymerized as described for instance in the Journal of American Chemical Society (vol. 82, page 866, 1960) to form useful polymers.

What is claimed is:

1. A process for making isocyanates of the formula RNCO wherein R is a hydrocarbon radical of not more than 18 carbon atoms which is attached to the NCO group by aliphatic carbon which comprises heating a di-substituted allophanyl chloride of the formula

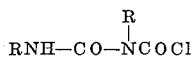

wherein R is as given above in an inert solvent to cause decomposition according to the formula

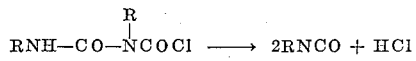

2. The process of claim 1 in which said inert solvent is a member of the group consisting of benzene, toluene, biphenyl, naphthalene, alpha-methylnaphthalene, beta-methylnaphthalene, high boiling petroleum fractions, chloroform, methylene chloride, ethylene dichloride, trichloroethane, tetrachloroethane, monochlorobenzene, orthodichlorobenzene, trichlorobenzenes, chlorotoluenes, chlorobiphenyls, dichlorobiphenyls, chloronaphthalenes, dialkylethers, and tetrahydrofuran.

3. The process of claim 2 in which R is alkyl.

4. The process of claim 3 in which the heating is effected at a temperature between 130° and 250° C.

5. The process of claim 3 in which the heating is carried out in the presence of a tertiary amine catalyst-scavenger for hydrogen chloride.

6. The process of claim 5 in which the heating is effected at a temperature below 150° C.

7. The process of claim 1 in which the heating is effected at a temperature between 130° and 250° C.

8. The process of claim 1 in which the heating is carried out in the presence of a tertiary amine catalyst-scavenger for hydrogen chloride.

9. The process of claim 8 in which the heating is effected at a temperature below 150° C.

10. A process for making alkyl isocyanate which comprises reacting phosgene with N,N'-dialkyl urea to form N,N'-dialkyl allophanyl chloride and thereafter decomposing such allophanyl chloride with loss therefrom of hydrogen chloride to form the alkyl isocyanate, wherein alkyl is of not more than 18 carbon atoms.

References Cited by the Examiner

UNITED STATES PATENTS

| | | | |
|---|---|---|---|
| 2,480,088 | 8/1949 | Slocombe et al. | 260—544 |
| 2,480,089 | 8/1949 | Slocombe et al. | 260—453 |
| 2,643,264 | 6/1953 | Fauser | 260—453 |
| 2,773,086 | 12/1956 | Slocombe et al. | 260—453 |
| 2,908,704 | 10/1959 | Skiles | 260—453 |
| 2,974,163 | 3/1961 | Julian et al. | 260—544 |
| 2,986,576 | 5/1961 | Bonetti et al. | 260—453 |

FOREIGN PATENTS

| | | |
|---|---|---|
| 29,929 | 5/1884 | Germany. |
| 898,406 | 6/1962 | Great Britain. |

CHARLES B. PARKER, *Primary Examiner.*

STANLEY H. LIEBERSTEIN, DALE R. MAHANAND,
*Assistant Examiners.*